(12) United States Patent
Peng et al.

(10) Patent No.: US 11,539,730 B2
(45) Date of Patent: Dec. 27, 2022

(54) METHOD, DEVICE, AND COMPUTER PROGRAM PRODUCT FOR ABNORMALITY DETECTION

(71) Applicant: EMC IP Holding Company LLC, Hopkinton, MA (US)

(72) Inventors: Fei Peng, Chengdu (CN); Kaikai Jia, Chengdu (CN)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 265 days.

(21) Appl. No.: 17/066,728

(22) Filed: Oct. 9, 2020

(65) Prior Publication Data
US 2022/0046039 A1    Feb. 10, 2022

(30) Foreign Application Priority Data

Aug. 7, 2020   (CN) .......................... 202010790880.2

(51) Int. Cl.
*H04L 9/40*     (2022.01)
*G06N 5/04*     (2006.01)
*G06N 20/00*    (2019.01)

(52) U.S. Cl.
CPC .......... *H04L 63/1425* (2013.01); *G06N 5/04* (2013.01); *G06N 20/00* (2019.01)

(58) Field of Classification Search
None
See application file for complete search history.

(56) References Cited

U.S. PATENT DOCUMENTS

2020/0076843 A1 * 3/2020 Luiggi ................ H04L 63/1433
2022/0138227 A1 * 5/2022 Wan ........................ H04L 43/08
707/737

* cited by examiner

*Primary Examiner* — Cai Y Chen
(74) *Attorney, Agent, or Firm* — Womble Bond Dickinson (US) LLP

(57) ABSTRACT

The present disclosure relates to a method, a device, and a computer program product for abnormality detection. The method provided by embodiments of the present disclosure includes: acquiring information related to a target request initiated by a client terminal to an application and at least one context request, the information at least indicating the type and initiation time of the target request and the type and initiation time of the at least one context request; converting the acquired information into a vectorized feature representation for the target request; and determining an abnormality detection result of the target request based on the vectorized feature representation and using an abnormality detection model, the abnormality detection result indicating whether the target request is an abnormal request, and the abnormality detection model characterizing a correlation between a vectorized feature representation for a request and an abnormality detection result.

20 Claims, 5 Drawing Sheets

METHOD, DEVICE, AND COMPUTER PROGRAM PRODUCT FOR ABNORMALITY DETECTION

CROSS-REFERENCE TO RELATED APPLICATION

This application claims the priority, under 35 U.S.C. § 119, of Chinese Patent Application No. 202010790880.2, filed Aug. 7, 2020, which is incorporated by reference in its entirety.

TECHNICAL FIELD

The present disclosure generally relates to the field of artificial intelligence (AI), and more particularly, to a method, an apparatus, a device, and a computer program product for abnormality detection.

BACKGROUND

Currently, many applications are deployed in public computing environments, such as in public clouds. Users may initiate requests to applications via client terminals to obtain corresponding services. Such deployment may provide services to more users. However, in public computing environments, applications may face various attacks, which may lead to data theft, data leakage, malicious data deletion or modification, etc. Injection hijacking and token hijacking are common attack means. Therefore, application security is a very important issue.

SUMMARY OF THE INVENTION

A solution for abnormality detection is provided according to some embodiments of the present disclosure.

In a first aspect of the present disclosure, a method for abnormality detection is provided. The method includes: acquiring information related to a target request initiated by a client terminal to an application and at least one context request, the information at least indicating the type and initiation time of the target request and the type and initiation time of the at least one context request; converting the acquired information into a vectorized feature representation for the target request; and determining an abnormality detection result of the target request based on the vectorized feature representation and using an abnormality detection model, the abnormality detection result indicating whether the target request is an abnormal request, and the abnormality detection model characterizing a correlation between a vectorized feature representation for a request and an abnormality detection result.

In a second aspect of the present disclosure, an electronic device is provided. The electronic device includes: at least one processor; and at least one memory storing computer program instructions, the at least one memory and the computer program instructions being configured to cause, with the at least one processor, the electronic device to perform actions. The actions include: acquiring information related to a target request initiated by a client terminal to an application and at least one context request, the information at least indicating the type and initiation time of the target request and the type and initiation time of the at least one context request; converting the acquired information into a vectorized feature representation for the target request; and determining an abnormality detection result of the target request based on the vectorized feature representation and using an abnormality detection model, the abnormality detection result indicating whether the target request is an abnormal request, and the abnormality detection model characterizing a correlation between a vectorized feature representation for a request and an abnormality detection result.

In a third aspect of the present disclosure, a computer program product is provided. The computer program product is tangibly stored on a non-volatile computer-readable medium and includes computer-executable instructions that, when executed, cause a device to perform actions. The actions include: acquiring information related to a target request initiated by a client terminal to an application and at least one context request, the information at least indicating the type and initiation time of the target request and the type and initiation time of the at least one context request; converting the acquired information into a vectorized feature representation for the target request; and determining an abnormality detection result of the target request based on the vectorized feature representation and using an abnormality detection model, the abnormality detection result indicating whether the target request is an abnormal request, and the abnormality detection model characterizing a correlation between a vectorized feature representation for a request and an abnormality detection result.

The summary part is provided to introduce the selection of concepts in a simplified form, which will be further described in the detailed description below. The summary part is neither intended to identify key features or main features of the present disclosure, nor intended to limit the scope of the present disclosure.

BRIEF DESCRIPTION OF THE DRAWINGS

The above and other objectives, features, and advantages of the embodiments of the present disclosure will become readily understandable by reading the following detailed description with reference to the accompanying drawings. In the accompanying drawings, several embodiments of the present disclosure are shown by way of example instead of limitation, where.

DETAILED DESCRIPTION

Figure 1:
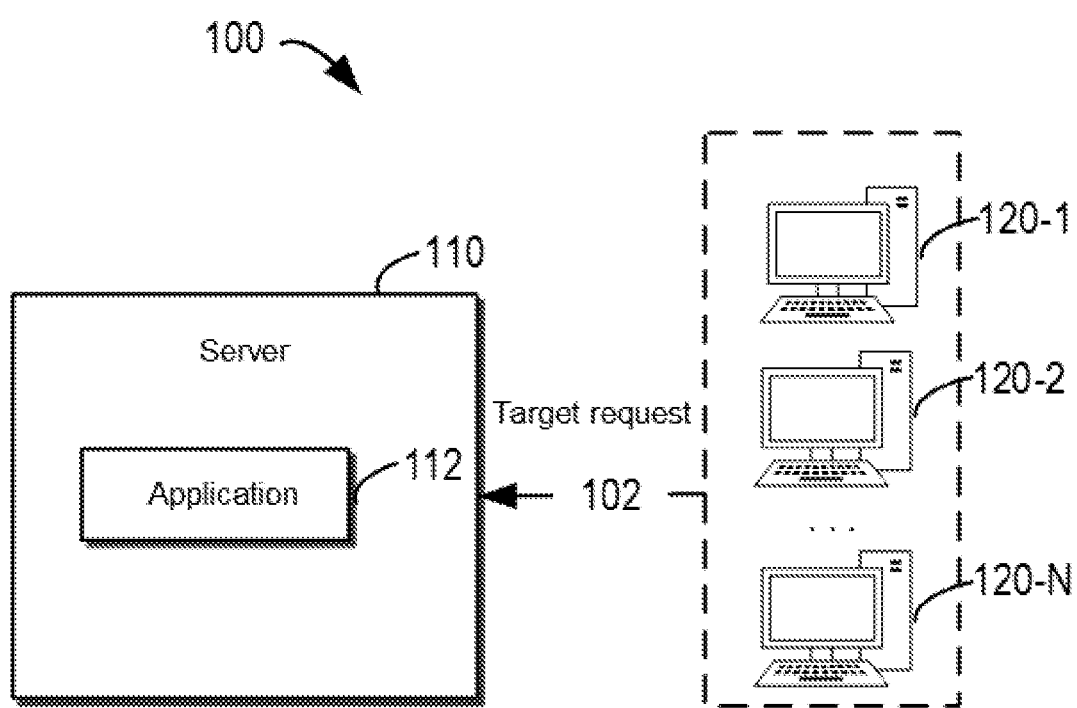
FIG. 1 shows an example environment in which embodiments of the present disclosure can be implemented.

Hereinafter, preferred implementations of the present disclosure will be described in more detail with reference to the accompanying drawings. Although the preferred implementations of the present disclosure are shown in the accompanying drawings, it should be understood that the present disclosure may be implemented in various forms and should not be limited by the implementations set forth herein. Rather, these implementations are provided so that the present disclosure will be more thorough and complete, and the scope of the present disclosure will be fully conveyed to those skilled in the art.

As used herein, the term "include" and variations thereof mean open-ended inclusion, that is, "including but not limited to." Unless specifically stated, the term "or" indicates "and/or." The term "based on" means "based at least in part on." The terms "one example implementation" and "one implementation" mean "at least one example implementation." The term "another implementation" means "at least one further implementation." The terms "first," "second," and the like may refer to different or identical objects. Other explicit and implicit definitions may also be included below.

As used herein, the term "model" may learn a correlation between corresponding inputs and outputs from training data, so that after training is completed, a corresponding output may be generated for a given input. Therefore, the trained model may be considered as being able to characterize this correlation between inputs and outputs.

Model generation may be based on a machine learning technology. Deep learning is a machine learning algorithm that uses multiple layers of processing units to process inputs and provide corresponding outputs. A neural network model is an example of a deep learning-based model. Herein, "model" may also be referred to as "machine learning model," "learning model," "machine learning network," or "learning network," and these terms are used interchangeably herein.

Usually, machine learning may include three stages, namely, a training stage, a testing stage, and a using stage (also referred to as a reasoning stage). In the training phase, a given model may be trained using a large amount of training data, and iteration is continuously performed until the model can obtain, from the training data, consistent inferences similar to inferences that can be made by human intelligence. Through training, the model may be considered as being able to learn a correlation between inputs and outputs (also referred to as a mapping from inputs to outputs) from the training data. The model may be represented as a function for mapping inputs into outputs. Parameter values of the trained model are determined. In the testing phase, a test input is applied to the trained model to test whether the model can provide a correct output, thereby determining the performance of the model. In the using phase, the model may be used to process an actual input based on the parameter values obtained by training to determine a corresponding output.

FIG. 1 shows an example environment in which embodiments of the present disclosure can be implemented. As shown in FIG. 1, example environment 100 includes server 110 in which application 112 is deployed. Application 112 may be applications that provide any type of services. An example of application 112 includes a data protection application, which is used to provide customers with services related to data protection, including data storage and access, maintenance, backup, recovery, etc. Other examples of application 112 also include data processing applications, data analysis applications, and the like.

In example environment 100, one or more client terminals 120-1, 120-2, . . . , 120-N may access application 112. For ease of discussion, client terminals 120-1, 120-2, . . . , 120-N are collectively referred to as or individually referred to as client terminal 120 herein, where N is an integer greater than or equal to 1. Client terminal 120 may send target request 102 for application 112 to server 110 to request a corresponding service. For example, for a data protection application, target request 102 may be a request for backing up data of client terminal 120. After receiving target request 102, server 110 may process target request 102 to run application 112 to provide a corresponding service.

In some embodiments, server 110 and/or client terminal 120 may be deployed in a public computing environment, for example, in a cloud computing environment. It may be any device with a computing capacity. Server 110 may be any physical or virtual device with a computing capacity, such as a centralized server, a distributed server, a mainframe, or an edge computing device. Although shown as a single device, server 110 or client terminal 120 may be implemented by one or more physical or virtual devices.

It should be understood that although FIG. 1 shows a single application deployed in a server, there may actually be a plurality of identical or different applications. Environment 110 may also include more servers and client terminals. The embodiments of the present disclosure are not limited in this respect.

When requests for applications are processed, some requests may be malicious requests from attackers. The execution of malicious requests may cause various security issues, such as data theft, data leakage, malicious data deletion or modification, etc. In order to improve the security level, it is desirable to be able to identify whether a request from a client terminal is a normal request or an abnormal request. However, there is currently no suitable solution to achieve such abnormal request detection, especially for requests for applications that are deployed in a public computing environment and may be from a plurality of client terminals.

The embodiments of the present disclosure provide a solution for abnormality detection. In this solution, for a target request initiated by a client terminal to an application, the context of the target request is acquired, including one or more context requests previously or subsequently initiated by the same client terminal that initiated the target request. For the purpose of abnormality detection, information related to the target request and the one or more context requests is acquired, including at least types and initiation times of these requests. This solution also uses a machine learning model to achieve abnormality detection. Specifically, the obtained information is converted into a vectorized feature representation. The vectorized feature representation is processed using an abnormality detection model so as to determine an abnormality detection result of the target request, which indicates whether the target request is an abnormal request.

According to the embodiments of the present disclosure, by considering the context of the request initiated by the same client terminal, it is possible to more accurately determine whether the current request is a normal or abnormal request. The detection of abnormal requests can effectively avoid potential dangers caused by the execution of the abnormal requests and improve the security level of the application.

Some example embodiments of the present disclosure will be described below with reference to the accompanying drawings.

Figure 2:
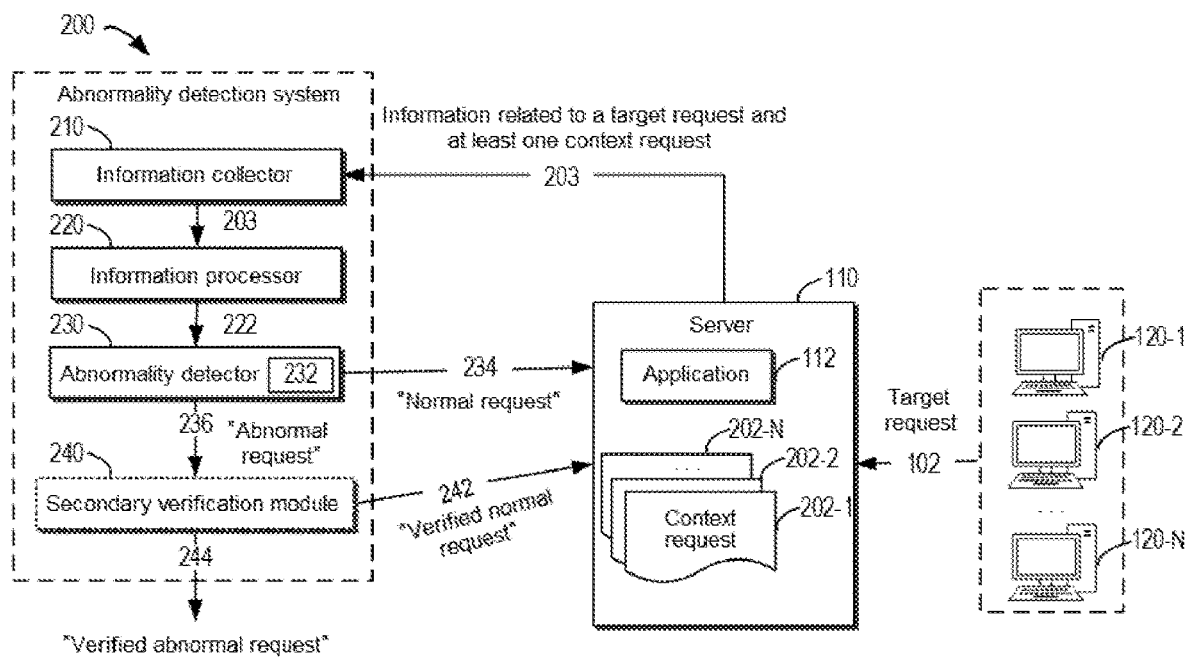
FIG. 2 shows a block diagram of a system for abnormality detection according to some embodiments of the present disclosure.

FIG. 2 shows a block diagram of system 200 for abnormality detection according to some embodiments of the present disclosure. Abnormality detection system 200 may be deployed to detect whether target request 102 of one or more client terminals 120 to application 112 is an abnormal request. In some embodiments, an abnormality detection result regarding whether target request 102 is a normal request or an abnormal request may be used by server 110 to determine how to process target request 102.

As shown in the figure, abnormality detection system 200 includes information collector 210, information processor 220, and abnormality detector 230. Abnormality detection system 200 may be implemented on a single or a plurality of computing devices having a computing capacity. In some embodiments, abnormality detection system 200 may be implemented, together with server 110 and the like, in a public computing environment, such as a cloud computing environment. Each component of abnormality detection system 220 may also be implemented by a single or a plurality of computing devices. Although shown as a separate system in FIG. 2, abnormality detection system 200 may also be implemented in server 110 in some embodiments.

According to an embodiment of the present disclosure, when performing abnormality detection on a target request, the context of the target request is simultaneously acquired, so that more features can be extracted for abnormality detection. Specifically, in operation, information collector 210 is configured to acquire information 203 related to target request 102 initiated by client terminal 120 to application 112 and at least one context request from server 110.

Herein, the context request of the target request refers to a request of which the initiation time precedes or follows the initiation time of the target request. The target request and context requests thereof may be requests initiated by the same client terminal 120 for the same application 112. In some embodiments, the context request of target request 102 may include one or more requests of which the initiation times precede the initiation time of target request 102, and such requests are also referred to as historical requests. This is advantageous in many scenarios, especially when fast real-time monitoring of target request 102 is required. Of course, in some embodiments, if the requirement of processing delay for target request 102 is not high, or corresponding client terminal 120 initiates a request relatively fast, one or more subsequent requests of which the initiation times follow the initiation time of target request 102 may also be collected.

Server 110 may record a request initiated by each client terminal 120 and record it as a context request for client terminal 120. As shown in FIG. 2, server 110 may record context request 202-1 for client terminal 120-1, context request 202-2 for client terminal 120-2, . . . , context request 202-N for client terminal 120-N. For ease of discussion, context requests 202-1, 202-2, . . . , 202-N may be collectively or individually referred to as context request 202. Server 110 may store the request from each client terminal 120 in a context request record corresponding to the client terminal.

Information 203 includes the type and initiation time of target request 102, and also includes respective types and initiation times of one or more context requests 202. A request initiated by client terminal 120 for application 112 may include the type and initiation time of the request and a parameter description associated with the request. Depending on services that can be provided by application 112, the types of requests initiated by client terminal 120 may be different. Different types of requests may require application 112 to perform different tasks. For the same application 112, the requests initiated by client terminal 120 may also be divided into a plurality of types. For example, for a data protection application, the type of a request initiated by client terminal 120 may include client terminal settings, client terminal registration, data backup, data recovery, data maintenance, and the like.

In some embodiments, for a request initiated by client terminal 120, its parameter description may include definitions of parameters required to execute the request. The parameter description is sometimes referred to as a "command line" specified in the request. In some examples, the parameter description associated with a request may include an identifier (ID) of client terminal 120, a user account number, a parameter designation for a task to be performed, and the like. Parameters in requests of different types may be different. Some parameters in requests of the same type may be set differently.

As an example only, examples of a data backup request and a data recovery request are given below. The data backup request may be defined as: 2018-03-27 02:18:45 avtar --id=xxxx --account=/xxxxx/xxxxxx -c/xxxx/ --hfsaddr=xxx.xxx.xxx. In this request, "2018-03-27 02:18:45" represents the initiation time of the request, and "avtar --id," "--account," "-c," "--hfsaddr," and other parameter fields are all defined (for illustrative purposes only, an "x" sequence is used to indicate the parameter description). Similarly, the data recovery request may be defined as: 2018-03-28 09:06:21 avtar --id=xxxx --account=/clients/xxxxx -x --hfsaddr=xxx.xxx.xxx --debug --logfile=/xxxx/xxxxx. In this request, some parameter fields "avtar--id" and "--account" are the same as those in the data backup request, while the parameter fields "-x --hfsaddr" and "--debug --logfile" may be specific to requests of a data recovery type.

It should be understood that only examples of some requests and their parameter descriptions are given above. In other examples, the request initiated for application 112 may be defined in other different forms.

In some embodiments, server 110 may record the request initiated from each client terminal 120 as context request 202 for the client terminal for use in subsequent abnormality detection by abnormality detection 200. In some embodiments, if information 203 to be collected by information collector 210 for abnormality detection of current target request 102 includes the type and the initiation time of context request 202 (as discussed below), server 110 may record the type and initiation time of context request (especially historical request) 202 without recording the associated parameter description. In some embodiments, if the abnormality detection of abnormality detection 200 requires a parameter description associated with context request 202, server 110 may also record such information. For target request 102, since the request may still need to be executed later, after receiving target request 102, server 110 will record a parameter description associated with target request 102 in addition to the type and initiation time.

In some embodiments, the information collection of information collector 210 may be triggered by server 110. For example, server 110 may initiate an abnormality detection request for target request 102 to abnormality detection system 200 after receiving target request 102 from client terminal 120. In response to the request, information collector 210 may perform information collection for the purpose of subsequent detection.

In some embodiments, information collector 210 may also directly collect an information part related to the target request and/or an information part related to at least one context request 202 from client terminal 120. For example, client terminal 120 may be required to send target request 102 to abnormality detection system 200. After abnormality detection system 200 determines that target request 102 is a normal request, target request 102 is sent to server 110 for processing. In this case, information collector 210 may collect and record information related to context request 202 of each client terminal 120 for subsequent use.

After collecting information 203 for specific target request 102, information collector 210 provides information 203 to information processor 220. Information processor 220 is configured to further process information 203 to extract detection information suitable for use by abnormality detector 230. Specifically, information processor 220 is configured to convert acquired information 203 into vectorized feature representation 222 for target request 102. Vectorized feature representation 222 may be considered as a vector including a plurality of dimension values to characterize the characteristics of information 203.

In some embodiments, information processor 220 is configured to map information 203 to corresponding vectorized feature representation 222 based on a predetermined mapping rule. The predetermined mapping rule may indicate how to perform feature engineering extraction on information 203.

As described above, information 203 includes various forms of information, such as initiation time, type, and possible parameter descriptions. These forms of information are respectively converted into various parts in vectorized feature representation 222. In some examples, vectorized feature representation 222 may include: a context part respectively corresponding to at least one context request 202, which includes various parts obtained by converting the type and initiation time of context request 202; and a target part corresponding to target request 102, which includes various parts obtained by converting the type, initiation time, and parameter description of target request 102. In some embodiments, values corresponding to these parts may be arranged into vectorized feature representation 222 in a predetermined order.

In order to better characterize the characteristics of information 203, the predetermined mapping rule may include mapping rules corresponding to different information forms in information 203. In some embodiments, for the types of target request 102 and context request 202, the predetermined mapping rule may include a first mapping between a plurality of request types and a first plurality of predetermined values. That is, the first mapping maps a plurality of potential request types for application 112 to different predetermined values. The predetermined value may be in a numerical form to facilitate subsequent processing.

Figures 3, 4:
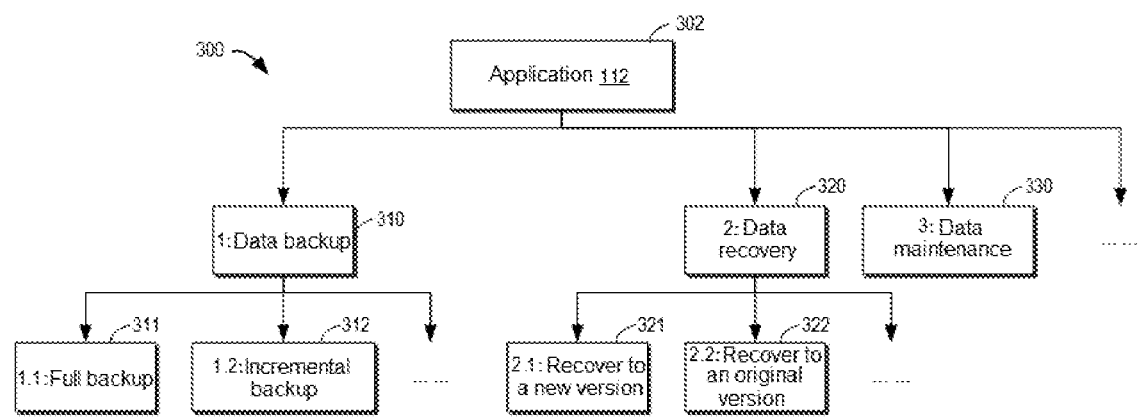
FIG. 3 shows an example representation of a mapping between request types and predetermined values according to some embodiments of the present disclosure.
FIG. 4 shows an example representation of one-hot encoding for a parameter description according to some embodiments of the present disclosure.

FIG. 3 shows an example of first mapping 300 between a plurality of request types and a first plurality of predetermined values. For ease of understanding, first mapping 300 may be represented as a tree structure, and root node 302 thereof indicates that first mapping 300 is for application 112. The requests that may be initiated to application 112 are divided into a plurality of request types, and each request type is mapped to a predetermined value. In the example of FIG. 3, node 310 indicates that a data backup request of application 112 is mapped to value "1," node 320 indicates that a data recovery request is mapped to value "2," node 330 indicates that a data maintenance request is mapped to value "3," and so on.

In some embodiments, a certain request type may be further divided into a plurality of subdivided request types. First mapping 300 may also indicate a mapping between these subdivided request types and corresponding predetermined values. As shown in FIG. 3, the data backup request may also be subdivided into a full backup request, an incremental backup request, and the like. Therefore, child node 311 following node 310 indicates that the full backup request is mapped to value "1.1," and child node 312 indicates that the full backup request is mapped to value "1.2." Similarly, the data recovery request may sometimes be divided into a request to recover to a new version, a request to recover to an original version, and the like. Therefore, child node 321 following node 320 indicates that the request to recover to a new version is mapped to value "2.1," and node 322 indicates that the request to recover to an original version is mapped to value "2.2."

In some embodiments, when defining the first mapping, predetermined values corresponding to subdivided request types under the same major type may be configured to be closer to each other (compared with other predetermined values of subdivided request types under another major type). For example, predetermined values (1.1 and 1.2) corresponding to a full backup request and an incremental backup request under the data backup request are relatively close, while predetermined values of two requests under the data recovery request are much closer to each other (compared with predetermined values 1.1 and 1.2).

It should be understood that FIG. 3 only shows an example mapping between request types and predetermined values. The predetermined value shown in FIG. 3 is only an example, and does not imply any limitation to the embodiments of the present disclosure. In other examples, any other predetermined values may also be set for mapping to different request types of application 112. In some embodiments, in addition to the tree structure shown in FIG. 3 to represent the first mapping, other forms, such as a list form, may also be used to represent the mapping between the request type of application 112 and the predetermined value.

Based on the first mapping between the request type and the predetermined value, information processor 220 may map the types of target request 102 and one or more context requests 202 indicated in information 203 to corresponding predetermined values, respectively. As an example, it is assumed that information 203 indicates that target request 102 is a full backup request, and two historical requests of target 102 are a request to recover to an original version and a request to recover to a new version, respectively. Based on the first mapping shown in the example of FIG. 3, information processor 220 may determine that the full backup request corresponds to predetermined value "1.1," and the request to recover to the original version and the request to recover to the new version correspond to predetermined values "2.2" and "2.1," respectively.

The partially processed information 203 may be represented as follows:

(2.2, [2018-03-27 02:18:45] +

2.1, [2018-03-28 09:06:21] + 1.1, [2018-03-29 12:06:21] + [ id:xxxx, account:/xxxx/xxxx, c:/xxx/, hfsaddr:xxx.xxx.xxx])

where "2.2," "2.1" and "1.1" represent predetermined values corresponding to first historical request 202, second historical request 202, and target request 102 respectively, [2018-03-27 02:18:45], [2018-03-28 09:06:21] and [2018-03-29 12:06:21] represent initiation times corresponding to first historical request 202, second historical request 202, and target request 102 respectively, [id: xxxx,account:/xxxqxxxx,c:/xxx/,hfsaddr:xxxx.xxx.xxx] and a parameter description of the target request.

In some embodiments, for the initiation times of target request 102 and context request 202, the predetermined mapping rule may include a second mapping between a plurality of time intervals and a second plurality of predetermined values. The plurality of time intervals may be divided from a request time period of client terminal 120 to application 112. In some cases, different client terminals 120 have certain request patterns, and such request patterns may be reflected in the timing of requests. Therefore, the initiation time of the request helps to capture whether target request 102 is abnormal. In order to better characterize the characteristics of time, a request time period may be divided into a plurality time intervals, which are used to convert the specific initiation times of target request 102 and context request 202. The request time period may be set according to the client terminal and the application, for example, it may be set to 1 day, 1 week, 1 month, etc.

As an example, the request time period of 24 hours in a day may be divided into a predetermined number of time intervals, for example, 48 time intervals, and the length of each time interval is half an hour. For example, 00:00-00:30 is a time interval, 00:30-01:00 is another time interval, and so on, until the time interval of 23:30-00:00. Each time interval may be mapped to a different preset value, such as a value from 1 to 48. In other examples, the length of the time interval is set to other values, or the request time period may also be other values.

When performing information processing, information processor 220 may determine time intervals into which the respective execution time of target request 102 and context request 202 falls, and determine predetermined values corresponding to the time intervals into which the requests fall based on a second mapping between time intervals and second predetermined values.

If only the request time period of one day is considered, for the initiation times of target request 102 and context request 202 in information 203, the specific time within a day may be considered regardless of the date. In the above example, for the initiation time of first historical request 202 [2018-03-27 02:18:45], it may be determined that time "02:18:45" falls into a time interval 02:00-02:30; for the initiation time of second historical request 202 [2018-03-28 09:06:21], it may be determined that time "09:06:21" falls into a time interval 09:00-09:30; for the initiation time of target request 102 [2018-03-29 12:06:21], it may be determined that time "12:06:21" falls into a time interval 12:00-12:30. Correspondingly, information processor 220 may determine predetermined values corresponding to these time intervals, for example, predetermined values 5, 19, and 25.

If the initiation time is processed, the partially processed information 203 may be represented as follows:

$$(2.2,5 + 2.1,19 + 1.1,25 + [id:xxxx,$$
$$account:/xxxx/xxxx, c:/xxx/, hfsaddr:xxxx.xxx.xxx])$$

It should be understood that the above only gives an example of converting the initiation time of the request into a part of the vectorized feature representation. The initiation time may also be converted in other ways, as long as different values can be used to indicate different initiation times. For example, pre-mapping may not be set, but the initiation time may be directly represented as a value in a predetermined format. For example, the initiation time of first historical request 202 [2018-03-27 02:18:45] may be represented as a value of 20180327021845, or may be represented as 021845 without considering the date but only considering the time of a day, and so on. Of course, by dividing into the time intervals, a value representation dimension for the initiation time may be better reduced.

In some embodiments, the number of context requests 202 used for abnormality monitoring of target request 102 may be a predetermined number. If the predetermined number of context requests of target request 102 cannot be collected in some cases, information processor 220 may also set context parts in the vectorized feature representation other than the context part corresponding to the available context request to a preset value. For example, if the required context requests 202 are 2 historical requests, but client terminal 120 only issues one historical request before initiating target request 102, then the type and initiation time of another historical request are both determined as predetermined value 0 in vectorized feature representation 222. In some embodiments, if client terminal 120 does not initiate any historical request before initiating target request 102, the types and the initiation times of two historical requests are determined to be predetermined values "0" in vectorized feature representation 222.

By determining an unavailable context request as a predetermined value, the context persistence of the request initiated by the client terminal by target request 102 may be well characterized. This can also be used to distinguish between normal requests and abnormal requests. For example, if stealing a token of legal client terminal 120, an attacker may use the token to directly initiate a backup request from illegal client terminal 120. However, from the context of the request of illegal client terminal 120, there is no historical request in the currently initiated backup request, that is, the context part corresponding to the historical request in vectorized feature representation 222 is represented as 0. This may imply the abnormality of the current target request, because a legal client terminal usually starts formal data protection tasks after setting up, registering, and other requests.

In order to obtain vectorized feature representation 222, information processor 220 may also continue to process a parameter description associated with target request 102 included in information 203. In some embodiments, information processor 220 converts the parameter description associated with target request 102 into a one-hot encoding representation. The parameter description helps to determine whether parameters in the request are all valid parameters during abnormality detection. For a malicious request from the attacker (which should be considered an abnormal request), the parameter description may have some abnormal characteristics. Therefore, through one-hot encoding of the parameter description, the differences between normal and abnormal parameters may be reflected more quickly.

One-hot encoding representation may include values of predetermined dimensions, and the value of each dimension corresponds to a valid symbol. If the parameter description includes the valid symbol, the value of the dimension may be represented as 1. If the valid symbol does not exist, the value of the dimension is represented as 0. In some embodiments, the parameter description may include the settings for a plurality of parameters (such as user accounts and request parameters). Each parameter may be mapped to a one-hot encoding representation, and then one-hot encoding representations of the plurality of parameters are combined into a total one-hot encoding representation of the parameter description associated with target request 102.

FIG. 4 shows example 400 of a one-hot encoding representation. In this example, it is assumed that the symbol of the parameter description may include 26 letter sets 410, 10 number sets 420, and one special symbol 430 (such as *, !, <, and other symbols). Parameter 1 to parameter n in the parameter description may be represented as a string of codes composed of 0 and 1, and value 1 or 0 of a corresponding bit indicates the presence or absence of a character at this position. Although the example in FIG. 4 shows a bit corresponding to a special symbol, in some embodiments, the presence or absence of different special symbols may be indicated by respectively corresponding bits.

For the parameter description associated with abnormal request 440, the parameters may have some abnormalities, so that the values of certain bits of the one-hot encoding representation are different from normal parameters. For example, the attacker may forge user account number "admin=>," and then the one-hot encoding representation corresponding to this parameter may indicate the presence of abnormal symbols "=" and ">." This helps to identify such abnormal requests later.

In some embodiments, in addition to one-hot encoding, other encoding technologies, especially technologies suitable for text or character encoding, may be used to convert the parameter description into a multi-dimensional vector representation.

In some embodiments, after the parameter description is also processed, the processed information 203 may be represented as follows:

(2.2,5+2.1,19+1.1,25+10 . . . 01000010 . . .
010101 . . . 010010 . . . 010101 . . . 01)

where "10 . . . 01000010 . . . 010101 . . . 010010 . . . 010101 . . . 01" is a one-hot code of the parameter description associated with the target request.

In some embodiments, the above processed information belongs to a vectorized representation and may be directly determined as vectorized feature representation 222. In some embodiments, information processor 220 may also perform normalization processing on the converted information to obtain vectorized feature representation 222. After normalization, values in different value ranges may be normalized to the same value interval (for example, a value interval from 0 to 1). For example, in the above processing, the range of values to which each request type is mapped is different from the range of values corresponding to the initiation time. In addition, the one-hot encoding representation is represented as a binary sequence string. These different value ranges may be unified through normalization processing.

In some embodiments, information processor 220 may use various data normalization methods to perform normalization processing. The data normalization methods may include, for example, a min-max method, standard scoring, standardization, etc. Just as an example, data normalization based on the min-max method may be represented as:

$$X' = \frac{X - X\text{min}}{X\text{max} - X\text{min}}$$

where X represents a value, such as a value corresponding to the types of target request 102 and context request 202 (for example, 2.2, 2.1, or 1.1), a value corresponding to the initiation time (for example, 5, 19, or 25), or a value corresponding to the parameter description (that is, one-hot encoding representation). X' represents a normalized value. $X_{max}$ and $X_{min}$ represents maximum and minimum values of this type of value, such as maximum and minimum values to which the request type in the first mapping is mapped, maximum and minimum values to which the time interval in the second mapping is mapped, and a maximum value (for example, an all-1 sequence) and a minimum value (for example, an all-zero sequence) of the one-hot encoding representation.

Through normalization, each value in the vectorized representation obtained after numerical mapping and one-hot encoding conversion may be processed into a value within a uniform value range, for example, a value range of 0 to 1. This facilitates subsequent abnormality detection.

Vectorized feature representation 222 generated by information processor 220 is provided to abnormality detector 230. In an embodiment of the present disclosure, abnormality detector 230 is configured to use abnormality detection model 232 to determine an abnormality detection result of target request 102 based on vectorized feature representation 222 to indicate whether target request 102 is a normal request or an abnormal request.

Abnormality detection model 232 is a trained model that may characterize a correlation between a vectorized feature representation for a request (that is, a model input) and an abnormality detection result (that is, a model output). The output of abnormality detection model 232 belongs to classification tasks, that is, the input is classified into two categories ("normal request" or "abnormal request"). Abnormality detection model 232 may be designed as any machine learning model or neural network model.

In some embodiments, abnormality detection model 232 may be designed as a support vector machine (SVM) model, such as a single-category SVM. In a scenario of abnormality detection, since there are usually a small number of negative samples (that is, abnormal requests) used for model training, most of the samples that can be collected are positive samples (that is, normal requests, also called white samples). The SVM model may support the training with a small number of data samples, and can also achieve good optimization. In various SVM models, the single-category SVM can better complete model training based on a large number of positive samples and a small number of negative samples. Therefore, constructing abnormality detection model 232 based on the SVM model, especially the single-category SMV model, is very beneficial for model optimization.

Figure 5:
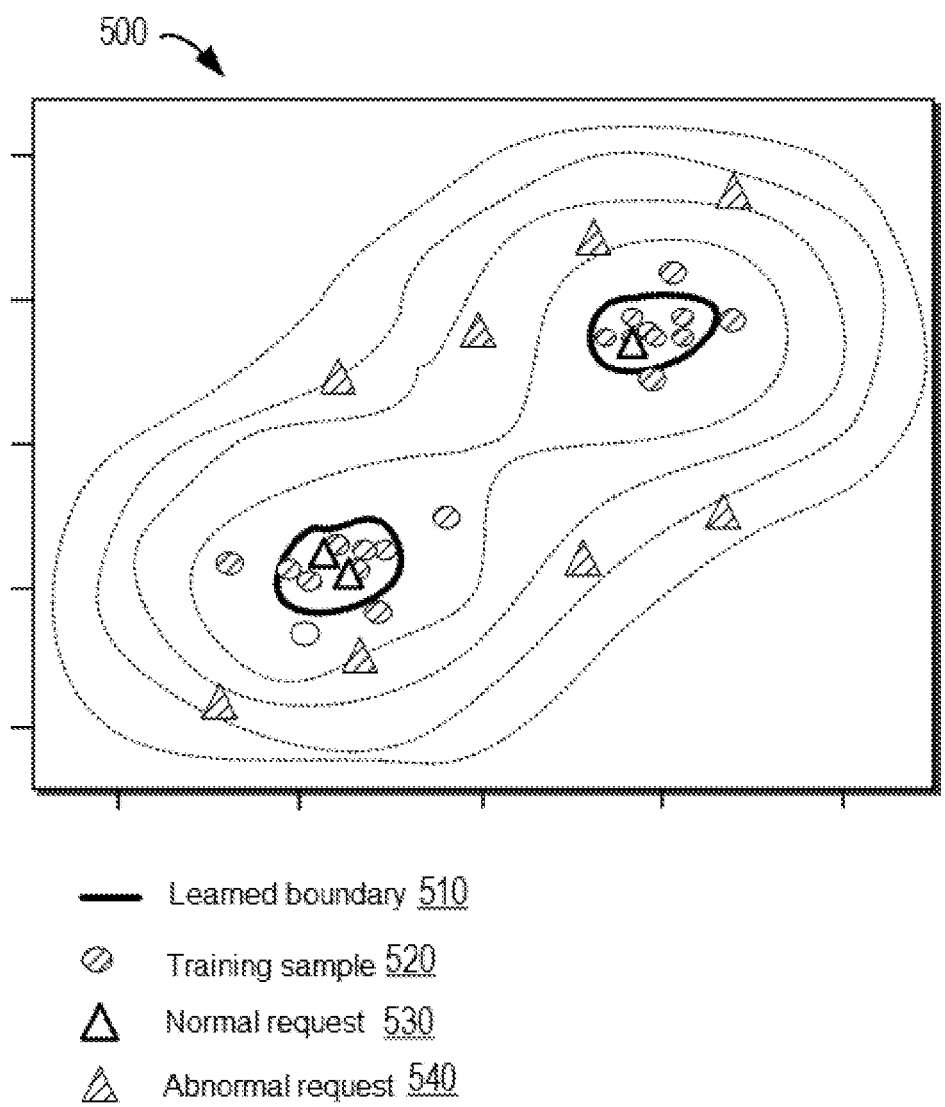
FIG. 5 shows an example of a sample boundary learned by an abnormality detection model according to some embodiments of the present disclosure.

The single-category SMV model may be trained as a classification principle of identifying data in one category from training data, and data that does not meet the classification principle is considered to be the other category. Such model learning is also suitable for abnormality monitoring. FIG. 5 shows example 500 of learning and application of abnormality detection model 232 based on a single-category SMV. As shown in FIG. 5, sample division boundary 510 may be learned from the training data, because most of training samples 520 may be aggregated at this boundary. After the training is completed, abnormality detection model 232 may be configured to determine a request falling within boundary 510 as normal request 530, and a request falling outside boundary 520 as abnormal request 540.

In some embodiments, abnormality detection model 232 may also be designed to be a model of any other type, and the embodiments of the present disclosure are not limited in this regard. In some embodiments, when abnormality detection model 232 is being trained, in order to improve the accuracy of abnormality detection, corresponding models may also be trained for application strategies of different client terminals of application 112. For example, if application 112 is a data protection application, for client terminals that may request application 112, one or more client terminals 120 may be assigned with or subscribed to different data protection strategies of application 112. Due to the different data protection strategies, the features of a request issued by client terminal 120 may be different. Therefore, a plurality of abnormality detection models 232 are trained through that different data protection strategies that can be provided by application 112. When performing abnormality detection, abnormality detector 230 may select corresponding abnormality detection model 232 to implement the detection for the data protection strategy applied by a client terminal currently issuing target request 102.

Continuing to refer back to FIG. 2, in some embodiments, after abnormality detector 230 determines that target request 102 is a normal request or an abnormal request, an indication may be sent to server 110 to indicate an abnormality detection result of target request 102.

For example, if abnormality detector 230 determines that target request 102 is a normal request, indication 232 is sent to server 110 to indicate that target request 102 is a "normal request." If abnormality detector 230 determines that target request 102 is an abnormal request, indication 234 is sent to server 110 to indicate that target request 102 is an "abnormal request." Alternatively or additionally, indication 234 may also be sent to other devices, such as client terminal 120, or used to notify a system administrator.

In some embodiments, optionally, abnormality detection system 200 may also include secondary verification module 240, as shown in FIG. 2. If abnormality detector 230 determines that target request 102 is an abnormal request, indication 236 is sent to secondary verification module 240 to indicate that target request 102 is an "abnormal request." Secondary verification module 240 may also use other checking modes to further verify whether target request 102 is an abnormal request. Any other checking modes may be adopted, and secondary verification may be performed even by introducing manual confirmation.

If secondary verification module 240 verifies that target request 102 is a normal request, indication 242 is sent to server 110 to indicate that target request 102 is a "verified normal request." Otherwise, secondary verification module 240 verifies that target request 102 is an abnormal request, indication 244 is sent to server 110 to indicate that target request 102 is a "verified abnormal request." Indication 244 may be sent to server 110, and/or may be sent to other devices, such as client terminal 120, or used to notify a system administrator.

If server 110 confirms that target request 102 is a normal request through indication 232 or indication 242, the request may be processed normally. Otherwise, if it is confirmed that target request 102 is an abnormal request, server 110 may refuse to process the request.

Figure 6:
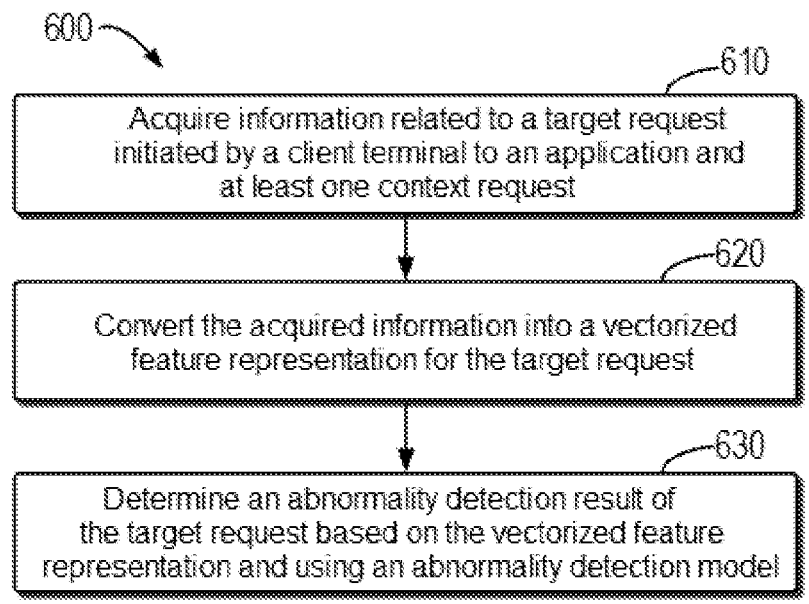
FIG. 6 shows a flowchart of a process of abnormality detection according to some embodiments of the present disclosure.

FIG. 6 shows a flowchart of process 600 of abnormality detection according to some embodiments of the present disclosure. Process 600 may be implemented by abnormality detection system 200 of FIG. 1. For ease of discussion, process 600 will be described with reference to FIG. 2.

At block 610, abnormality detection system 200 acquires information related to a target request initiated by a client terminal to an application and at least one context request. The information at least indicates the type and initiation time of the target request and the type and initiation time of the at least one context request. At block 620, abnormality detection system 200 converts the acquired information into a vectorized feature representation for the target request. At block 630, abnormality detection system 200 determines an abnormality detection result of the target request based on the vectorized feature representation and using an abnormality detection model. The abnormality detection result indicates whether the target request is an abnormal request. The abnormality detection model characterizes a correlation between a vectorized feature representation for a request and an abnormality detection result.

In some embodiments, converting the acquired information into the vectorized feature representation includes: determining, based on a first mapping between a plurality of request types and a first plurality of predetermined values, predetermined values respectively corresponding to the type of the target request and the type of the at least one context request from the plurality of predetermined values; and determining a part of the vectorized feature representation based on the determined predetermined values.

In some embodiments, converting the acquired information into the vectorized feature representation includes: determining, from a plurality of time intervals, a first time interval into which the initiation time of the target request falls and at least one second time interval into which the initiation time of the at least one context request falls, the plurality of time intervals being divided from a request time period of the client terminal to the application; determining, based on a second mapping between the plurality of time intervals and a second plurality of predetermined values, predetermined values respectively corresponding to the first time interval and the at least one second time interval from the second plurality of predetermined values; and determining the other part of the vectorized feature representation based on the determined predetermined values.

In some embodiments, the information further indicates a parameter description associated with the target request. In some embodiments, converting the acquired information into the vectorized feature representation includes: converting the parameter description into a one-hot encoding representation; and determining the other part of the vectorized feature representation based on the one-hot encoding representation.

In some embodiments, the vectorized feature representation is configured to include context parts corresponding to a predetermined number of context requests. In some embodiments, converting the acquired information into the vectorized feature representation includes: setting, if it is determined that the number of the at least one context request indicated by the information is less than the predetermined number, context parts in the vectorized feature representation other than the context part corresponding to the at least one context request to a preset value.

In some embodiments, the application includes a data protection application. Process 600 further includes: selecting the abnormality detection model based on a data protection strategy applied by the client terminal in the data protection application, the abnormality detection model being trained based on training data related to the data protection strategy.

In some embodiments, the at least one context request includes at least one historical request of which the initiation time precedes the initiation time of the target request.

Figure 7:
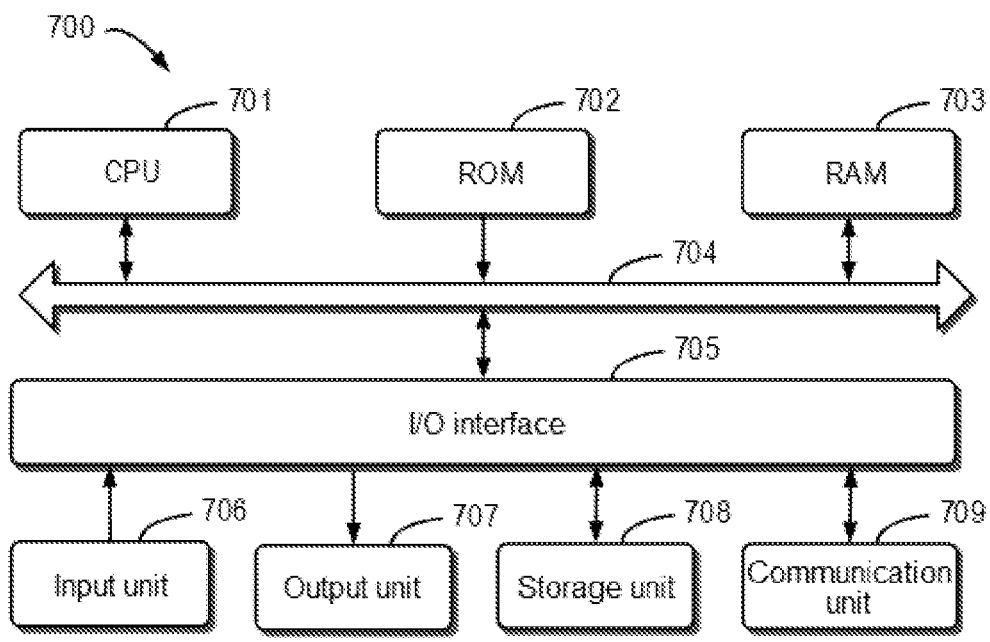
FIG. 7 shows a block diagram of a computing device in which one or more embodiments of the present disclosure may be implemented.

FIG. 7 schematically shows a block diagram of device 700 that can be configured to implement an embodiment of the present disclosure. It should be understood that device 700 shown in FIG. 7 is merely an example and should not constitute any limitation to the function and scope of the embodiments described herein. Device 700 shown in FIG. 7 may be configured to implement process 600 of FIG. 6. Device 700 shown in FIG. 7 may be implemented as or be included in abnormality detection system 200 of FIG. 2 or be a part of abnormality detection system 200.

As shown in FIG. 7, device 700 includes central processing unit (CPU) 701 which may execute various appropriate actions and processing in accordance with computer program instructions stored in read-only memory (ROM) 702 or computer program instructions loaded onto random access memory (RAM) 703 from storage unit 708. Various programs and data required for operations of device 700 may also be stored in RAM 703. CPU 701, ROM 702, and RAM 703 are connected to each other through bus 704. Input/output (I/O) interface 705 is also connected to bus 704.

A plurality of components in device 700 are connected to I/O interface 705, including: input unit 706, such as a keyboard and a mouse; output unit 707, such as various types of displays and speakers; storage unit 708, such as a magnetic disk and an optical disc; and communication unit 709, such as a network card, a modem, and a wireless communication transceiver. Communication unit 709 allows device 700 to exchange information/data with other devices over a computer network such as the Internet and/or various telecommunication networks.

The various processes and processing described above, such as process 600, may be performed by processing unit 701. For example, in some embodiments, process 600 may be implemented as a computer software program that is tangibly included in a machine-readable medium, for example, storage unit 708. In some embodiments, part or all of the computer program may be loaded and/or installed onto device 700 via ROM 702 and/or communication unit 709. When the computer program is loaded onto RAM 703 and executed by CPU 701, one or more steps of process 600 described above may be performed.

The embodiments of the present disclosure may further provide a computer-readable storage medium having computer-executable instructions stored thereon. The computer-executable instructions are executed by a processor to implement the method described above. According to an example implementation of the present disclosure, a computer program product is further provided. The computer program product is tangibly stored on a non-transitory computer-readable medium and includes computer-executable instructions. The computer-executable instructions are executed by a processor to implement the method described above.

Various aspects of the present disclosure are described herein with reference to flowcharts and/or block diagrams of the method, the apparatus, the device, the computer-readable medium, and the computer program product according to implementations of the present disclosure. It should be understood that each block in the flowcharts and/or block diagrams as well as a combination of blocks in the flowcharts and/or block diagrams may be implemented by using computer-readable program instructions.

These computer-readable program instructions may be provided to a processing unit of a general-purpose computer, a special-purpose computer, or another programmable data processing apparatus, thereby producing a machine, such that these instructions, when executed by the processing unit of the computer or another programmable data processing apparatus, produce a means for implementing the functions/actions specified in one or more blocks in the flowcharts and/or block diagrams. The computer-readable program instructions may also be stored in a computer-readable storage medium, to cause a computer, a programmable data processing apparatus, and/or other devices to work in a specific manner, such that the computer-readable medium storing the instructions includes an article of manufacture that contains instructions for implementing various aspects of the functions/actions specified in one or more blocks in the flowcharts and/or block diagrams.

The computer-readable program instructions may be loaded onto a computer, another programmable data processing apparatus, or another device, so that a series of operating steps can be performed on the computer, another programmable data processing apparatus, or another device to produce a computer-implemented process. Therefore, the instructions executed on the computer, another programmable data processing apparatus, or another device implement the functions/actions specified in one or more blocks in the flowcharts and/or block diagrams.

The flowcharts and block diagrams in the accompanying drawings illustrate the architectures, functions, and operations of possible implementations of systems, methods, and computer program products according to multiple implementations of the present disclosure. In this regard, each block in the flowcharts or block diagrams may represent a module, a program segment, or a part of an instruction that contains one or more executable instructions for implementing specified logical functions. In some alternative implementations, functions labeled in the blocks may also occur in an order different from that labeled in the accompanying drawings. For example, two successive blocks may actually be performed basically in parallel, or they may be performed in an opposite order sometimes, depending on the functions involved. It should be further noted that each block in the block diagrams and/or flowcharts as well as a combination of blocks in the block diagrams and/or flowcharts may be implemented by using a dedicated hardware-based system for executing specified functions or actions or by a combination of dedicated hardware and computer instructions.

As used herein, the term "determine" encompasses a variety of actions. For example, "determine" may include operating, computing, processing, exporting, surveying, searching (for example, searching in a table, database, or another data structure), identifying, and the like. In addition, "determine" may include receiving (for example, receiving information), accessing (for example, accessing data in a memory), and the like. In addition, "determine" may include parsing, selecting, choosing, establishing, and the like.

Various implementations of the present disclosure have been described above. The above description is illustrative rather than exhaustive, and is not limited to the various implementations disclosed. Many modifications and variations will be apparent to those of ordinary skill in the art without departing from the scope and spirit of the illustrated various implementations. The selection of terms as used herein is intended to best explain the principles and practical applications of the various implementations or the improvements to technologies on the market, or to enable other persons of ordinary skill in the art to understand the implementations disclosed here.

The invention claimed is:

1. A method for abnormality detection, comprising:
acquiring information related to a target request initiated by a client terminal to an application and at least one context request, the information at least indicating the type and initiation time of the target request and the type and initiation time of the at least one context request;
converting the acquired information into a vectorized feature representation for the target request; and
determining an abnormality detection result of the target request based on the vectorized feature representation and using an abnormality detection model, the abnormality detection result indicating whether the target request is an abnormal request, and the abnormality detection model characterizing a correlation between a vectorized feature representation for a request and an abnormality detection result.

2. The method according to claim 1, wherein converting the acquired information into the vectorized feature representation comprises:
   determining, based on a first mapping between a plurality of request types and a first plurality of predetermined values, predetermined values respectively corresponding to the type of the target request and the type of the at least one context request from the plurality of predetermined values; and
   determining a part of the vectorized feature representation based on the determined predetermined values.

3. The method according to claim 1, wherein converting the acquired information into the vectorized feature representation comprises:
   determining, from a plurality of time intervals, a first time interval into which the initiation time of the target request falls and at least one second time interval into which the initiation time of the at least one context request falls, the plurality of time intervals being divided from a request time period of the client terminal to the application;
   determining, based on a second mapping between the plurality of time intervals and a second plurality of predetermined values, predetermined values respectively corresponding to the first time interval and the at least one second time interval from the second plurality of predetermined values; and
   determining the other part of the vectorized feature representation based on the determined predetermined values.

4. The method according to claim 1, wherein the information further indicates a parameter description associated with the target request, and converting the acquired information into the vectorized feature representation comprises:
   converting the parameter description into a one-hot encoding representation; and
   determining the other part of the vectorized feature representation based on the one-hot encoding representation.

5. The method according to claim 1, wherein the vectorized feature representation is configured to comprise context parts corresponding to a predetermined number of context requests, and converting the acquired information into the vectorized feature representation comprises:
   setting, if it is determined that the number of the at least one context request indicated by the information is less than the predetermined number, context parts in the vectorized feature representation other than the context part corresponding to the at least one context request to a preset value.

6. The method according to claim 1, wherein the application comprises a data protection application, and the method further comprises:
   selecting the abnormality detection model based on a data protection strategy applied by the client terminal in the data protection application, the abnormality detection model being trained based on training data related to the data protection strategy.

7. The method according to claim 1, wherein the at least one context request comprises at least one historical request of which the initiation time precedes the initiation time of the target request.

8. An electronic device, comprising:
   at least one processor; and
   at least one memory storing computer instructions, which when executed by the at least one processor, cause the at least one processor to perform actions comprising:
   acquiring information related to a target request initiated by a client terminal to an application and at least one context request, the information at least indicating the type and initiation time of the target request and the type and initiation time of the at least one context request;
   converting the acquired information into a vectorized feature representation for the target request; and
   determining an abnormality detection result of the target request based on the vectorized feature representation and using an abnormality detection model, the abnormality detection result indicating whether the target request is an abnormal request, and the abnormality detection model characterizing a correlation between a vectorized feature representation for a request and an abnormality detection result.

9. The device according to claim 8, wherein converting the acquired information into the vectorized feature representation comprises:
   determining, based on a first mapping between a plurality of request types and a first plurality of predetermined values, predetermined values respectively corresponding to the type of the target request and the type of the at least one context request from the plurality of predetermined values; and
   determining a part of the vectorized feature representation based on the determined predetermined values.

10. The device according to claim 8, wherein converting the acquired information into the vectorized feature representation comprises:
   determining, from a plurality of time intervals, a first time interval into which the initiation time of the target request falls and at least one second time interval into which the initiation time of the at least one context request falls, the plurality of time intervals being divided from a request time period of the client terminal to the application;
   determining, based on a second mapping between the plurality of time intervals and a second plurality of predetermined values, predetermined values respectively corresponding to the first time interval and the at least one second time interval from the second plurality of predetermined values; and
   determining the other part of the vectorized feature representation based on the determined predetermined values.

11. The device according to claim 8, wherein the information further indicates a parameter description associated with the target request, and converting the acquired information into the vectorized feature representation comprises:
   converting the parameter description into a one-hot encoding representation; and
   determining the other part of the vectorized feature representation based on the one-hot encoding representation.

12. The device according to claim 8, wherein the vectorized feature representation is configured to comprise context parts corresponding to a predetermined number of context requests, and converting the acquired information into the vectorized feature representation comprises:
   setting, if it is determined that the number of the at least one context request indicated by the information is less than the predetermined number, context parts in the vectorized feature representation other than the context part corresponding to the at least one context request to a preset value.

13. The device according to claim 8, wherein the application comprises a data protection application, and the method further comprises:
selecting the abnormality detection model based on a data protection strategy applied by the client terminal in the data protection application, the abnormality detection model being trained based on training data related to the data protection strategy.

14. The device according to claim 8, wherein the at least one context request comprises at least one historical request of which the initiation time precedes the initiation time of the target request.

15. A computer program product stored on a non-transitory computer-readable medium and comprising computer-executable instructions, which when executed by a processor, cause the processor to perform actions comprising:
acquiring information related to a target request initiated by a client terminal to an application and at least one context request, the information at least indicating the type and initiation time of the target request and the type and initiation time of the at least one context request;
converting the acquired information into a vectorized feature representation for the target request; and
determining an abnormality detection result of the target request based on the vectorized feature representation and using an abnormality detection model, the abnormality detection result indicating whether the target request is an abnormal request, and the abnormality detection model characterizing a correlation between a vectorized feature representation for a request and an abnormality detection result.

16. The computer program product according to claim 15, wherein converting the acquired information into the vectorized feature representation comprises:
determining, based on a first mapping between a plurality of request types and a first plurality of predetermined values, predetermined values respectively corresponding to the type of the target request and the type of the at least one context request from the plurality of predetermined values; and
determining a part of the vectorized feature representation based on the determined predetermined values.

17. The computer program product according to claim 15, wherein converting the acquired information into the vectorized feature representation comprises:

determining, from a plurality of time intervals, a first time interval into which the initiation time of the target request falls and at least one second time interval into which the initiation time of the at least one context request falls, the plurality of time intervals being divided from a request time period of the client terminal to the application;
determining, based on a second mapping between the plurality of time intervals and a second plurality of predetermined values, predetermined values respectively corresponding to the first time interval and the at least one second time interval from the second plurality of predetermined values; and
determining the other part of the vectorized feature representation based on the determined predetermined values.

18. The computer program product according to claim 15, wherein the information further indicates a parameter description associated with the target request, and converting the acquired information into the vectorized feature representation comprises:
converting the parameter description into a one-hot encoding representation; and
determining the other part of the vectorized feature representation based on the one-hot encoding representation.

19. The computer program product according to claim 15, wherein the vectorized feature representation is configured to comprise context parts corresponding to a predetermined number of context requests, and converting the acquired information into the vectorized feature representation comprises:
setting, if it is determined that the number of the at least one context request indicated by the information is less than the predetermined number, context parts in the vectorized feature representation other than the context part corresponding to the at least one context request to a preset value.

20. The computer program product according to claim 15, wherein the application comprises a data protection application, and the method further comprises:
selecting the abnormality detection model based on a data protection strategy applied by the client terminal in the data protection application, the abnormality detection model being trained based on training data related to the data protection strategy.

* * * * *